Figure 1:
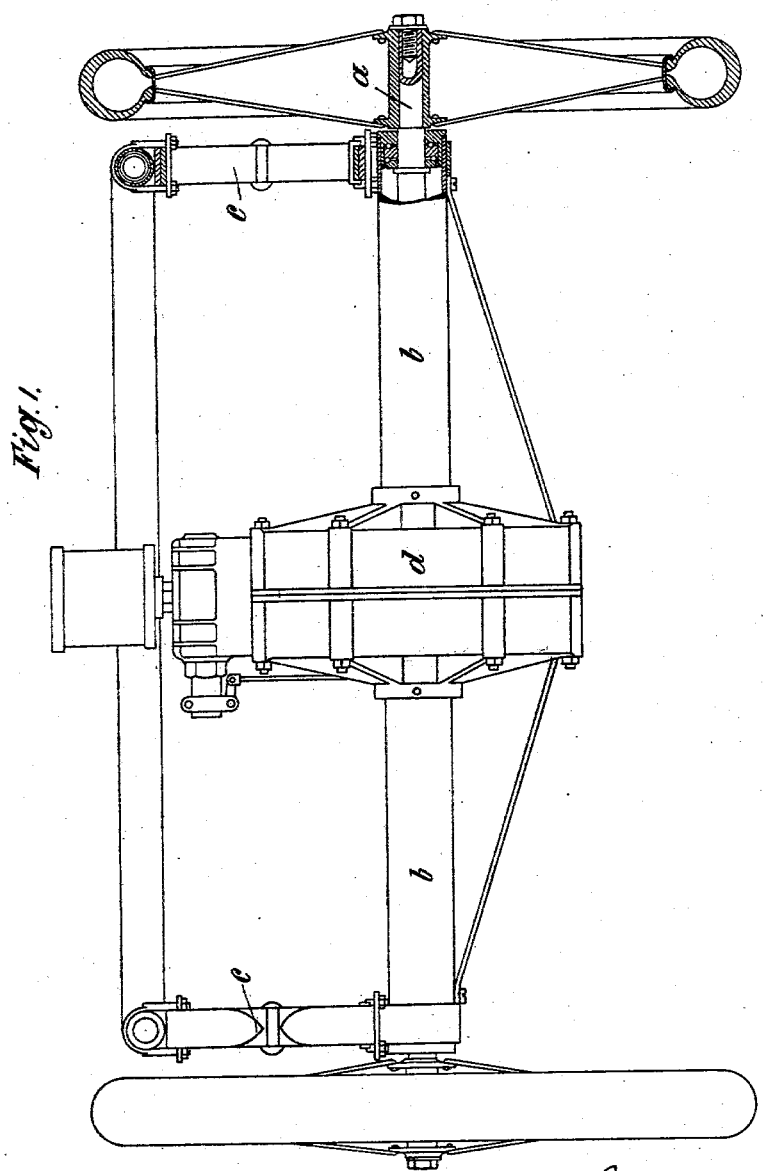

No. 739,687. PATENTED SEPT. 22, 1903.
F. KÜPPER & A. E. VORREITER.
DRIVING MECHANISM FOR MOTOR VEHICLES.
APPLICATION FILED APR. 4, 1900.
NO MODEL. 3 SHEETS—SHEET 1.

No. 739,687. PATENTED SEPT. 22, 1903.
F. KÜPPER & A. E. VORREITER.
DRIVING MECHANISM FOR MOTOR VEHICLES.
APPLICATION FILED APR. 4, 1900.
NO MODEL. 3 SHEETS—SHEET 2.
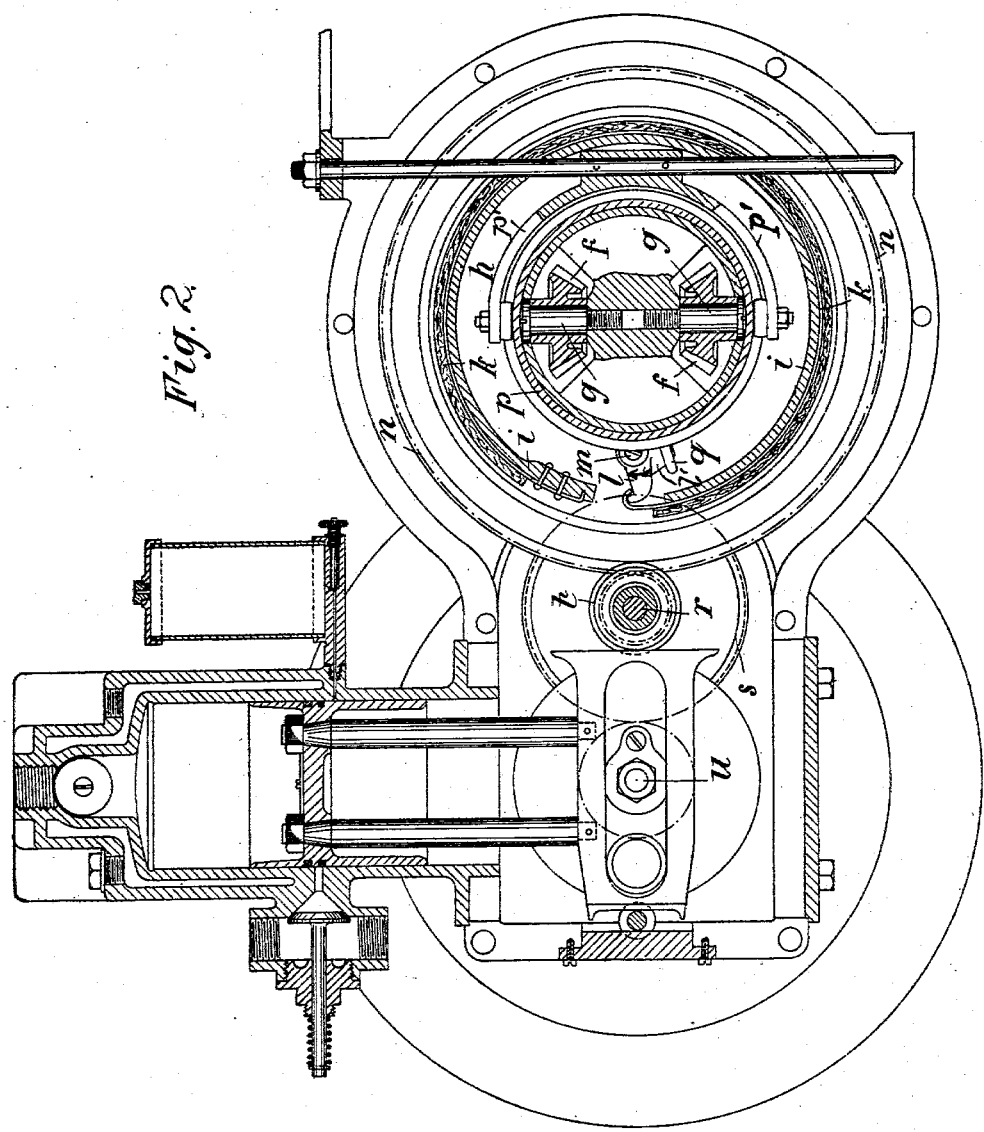

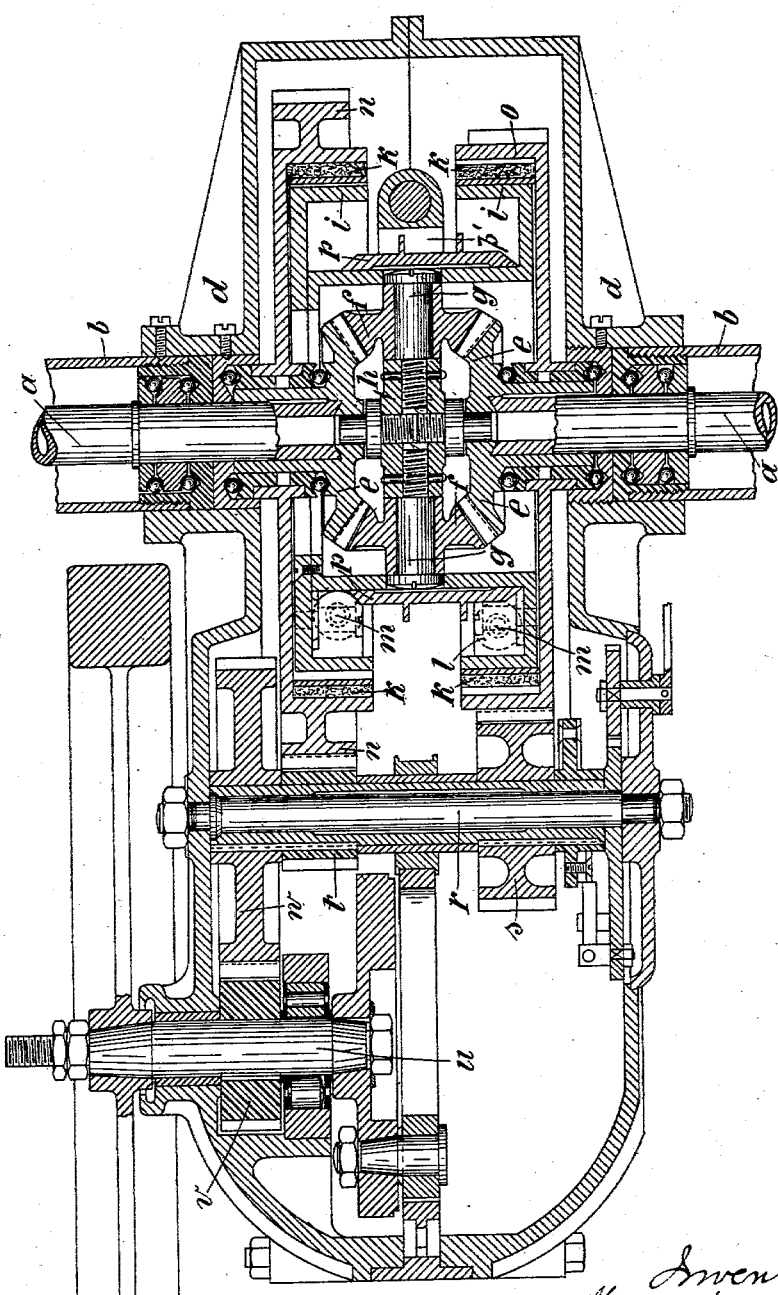

No. 739,687. Patented September 22, 1903.

UNITED STATES PATENT OFFICE.

FRANZ KÜPPER AND ANSBERT EMIL VORREITER, OF AIX-LA-CHAPELLE, GERMANY, ASSIGNORS TO THE AACHENER STAHLWAARENFABRIK, VORM. CARL SCHWANEMEYER, ACTIEN-GESELLSCHAFT, OF AIX-LA-CHAPELLE, PRUSSIA, GERMANY.

DRIVING MECHANISM FOR MOTOR-VEHICLES.

SPECIFICATION forming part of Letters Patent No. 739,687, dated September 22, 1903.

Application filed April 4, 1900. Serial No. 11,527. (No model.)

*To all whom it may concern:*

Be it known that we, FRANZ KÜPPER and ANSBERT EMIL VORREITER, both subjects of the King of Prussia, German Emperor, residing at Aix-la-Chapelle, Prussia, in the German Empire, have invented certain new and useful Improvements in Driving Mechanism for Motor Vehicles, of which the following is a specification.

This invention has reference to an actuating mechanism for motor wheels and carriages where the motor-engine is directly connected to the differential gearing and to the driving-shafts and where all the different parts of the driving or propelling mechanism form a self-contained structure, so as to allow of applying them to already-existing vehicles of other construction which may be converted into motor-vehicles in this manner.

The new construction of motor-vehicles described in the following specification does away with all elastic or yielding means of transmission with all the inconveniences attendant thereon, gear-wheels or pinions being used instead of such elastic or yielding means for the purpose of transmitting the power from the motor-engine to the driving-shaft in the desired ratio. The connection of the several parts is, however, such that the car-frame may be yieldingly connected to the driving-wheels, as in the former constructions. Besides, in this invention all the actuating parts on which the propelling of the vehicle depends are arranged around the differential gearing, including the power-generator, whereby it becomes possible to arrange all these parts within one single completely-closed casing, which serves both as a protection and as an oil-bath.

In the accompanying drawings the new arrangement and construction of the actuating mechanism of a motor-carriage are shown, a benzene-motor engine being used in this example as a power-generator.

In the drawings, Figure 1 is a rear elevation showing the actuating mechanism in place on a motor-vehicle. Fig. 2 is a vertical section, on an enlarged scale, of the driving mechanism; and Fig. 3 shows the driving mechanism in horizontal section.

The two driving-wheels of a motor-vehicle are keyed to the shafts $a\ a$, which are respectively surrounded by sleeves $b$, which are connected to the frame of the motor-vehicle by means of springs $c$. The said sleeves are screwed into a casing $d\ d$, made in two sections and which contains all the other actuating parts. The ends of the driving-shafts $a$ are continued into the casing $d$, and they are respectively provided at the inside thereof with a bevel gear-wheel $e$, and these gear-wheels, with the bevel gear-wheels $f\ f$, engaging therewith, form the differential gearing. The gear-wheels $f$ are mounted upon studs $g$, screwed into the central part $h$ of the casing of the differential gearing. The flanges $i\ i$ of this casing are shaped so as to form friction-couplings. They are provided upon their outer surface with two brake-bands $k\ k$, each of which consists of a spring-steel band covered with leather, one end of each band being hook-shaped, Figs. 2 and 3. Each of these hooks is engaged by a lever $l$, these levers being pivoted on bolts or studs $m$, screwed into the flange of the casing of the differential gearing. If either one of the said levers $l$ is moved in the direction of the arrow, Fig. 2, it operates to contract the respective brake-band $k$ by means of the hook, the brake-band placing itself around the periphery of the flange $i$ and coming out of contact with the driving gear-wheel $o$ or $n$, surrounding the said flange. When the brake-band is engaged with either of the wheels $o$ or $n$, it serves as a frictional connection between such wheel and the casing of the differential gearing.

The levers $l$ are operated by a ring $p$, which may be displaced along the casing of the differential gearing to the left or to the right by means of the fork $p'$. The ring $p$ is beveled off on both ends, as shown in Fig. 3, so as to allow of its slipping under the rollers $q$, mounted on pins on the arms $l'$ of the levers $l$, like a wedge, the rollers being thereby raised, resulting in the movement of the levers $l$ in the direction of the arrow.

The driving gear-wheels $n$ $o$ are not keyed to the driving-shafts $a$; but they are capable of rotation on these shafts by means of ball-journals or roller-journals. The gear-wheels are actuated by two smaller gear-wheels $s$ and $t$, mounted on the shaft $r$. These smaller gear-wheels may either be rotated directly by the motor-engine, the shaft $r$ becoming the motor-shaft, or they may be actuated by a separate motor-shaft $u$ by means of the two gear-wheels $v$ and $w$, as shown in the drawings.

If a four-cycle explosion motor-engine is used as a power-generator, as is the case in the construction shown by way of example, the advantage is obtained, by the employment of a separate motor-shaft, of being able to use the counter-shaft $r$, to which the rotation is transmitted at the ratio of one to two, as a cam-shaft for the valve-motion at the same time. Inasmuch as the shaft $r$ is moving at half the speed of the motor-shaft only, a smaller diameter may be given to the driving gear-wheels $n$ $o$, thus not only greatly reducing the cost of manufacture of these wheels and reducing their weight, but also allowing of a smaller diameter, less weight, and a more pleasing appearance being given to the driving-mechanism as a whole.

As shown in the drawings, the two large gear-wheels $n$ $o$ and the corresponding gear-wheels $t$ $s$ have different diameters, so that a different speed of rotation is imparted to the driving gear-wheels $n$ $o$. Hence the speed of rotation of the driving-wheels of the motor-vehicle will also be different, according to the friction-coupling $k$ being in engagement with one of these wheels. If the ring $p$ is in the middle of the device intermediate between the wheels, none of the driving gear-wheels is in engagement, and the motor-vehicle is stopped, while the motor-engine itself continues to run without doing work.

If the casing $d$ is made sufficiently broad and the shaft $r$ is extended far enough, a larger number of gear-wheels $n$ $o$ and of corresponding gear-wheels $s$ and $t$ may be arranged within the casing in order to be able to provide for still further varying the speed at which the vehicle may be driven.

What we claim, and desire to secure by Letters Patent of the United States, is—

1. In a driving mechanism for motor-vehicles, the combination with an axle and differential gearing connected thereto, of a casing inclosing the differential gearing and connected thereto, two driving-gears surrounding the casing, a ring displaceable on the casing, friction devices connected to the casing and interposed respectively between the casing and the respective gears and normally tending to engage the gears, and means actuated by said ring for moving either of said friction devices out of engagement with its gear, substantially as set forth.

2. In a driving mechanism for motor-vehicles and the like, in combination a differential gearing and a motor driving-gear, a casing connected to said differential gearing, a ring displaceable on said casing, and a friction-coupling actuated by said ring and serving to couple the differential gearing with the motor driving-wheels, substantially as described.

3. In a driving mechanism for motor-vehicles, the combination with an axle and differential gearing connected thereto, of a casing inclosing the differential gearing and connected thereto, two driving-gears surrounding the casing, two spring-bands connected to the casing and lying respectively between the casing and the respective gear and normally tending to frictionally engage said gears, and means for contracting either one or both of said bands about the casing to disengage them from their respective gear-wheels, substantially as set forth.

In witness whereof we have hereunto signed our names in the presence of two subscribing witnesses.

FRANZ KÜPPER.
ANSBERT EMIL VORREITER.

Witnesses:
J. SCOTT,
E. U. BRUNDAGE.